(12) United States Patent
Auffray

(10) Patent No.: US 6,337,982 B2
(45) Date of Patent: *Jan. 8, 2002

(54) CORDLESS TELEPHONY DEVICE HAVING A SCANNING ELEMENT TO ANALYZE A FRAME REQUESTING A CONNECTION

(75) Inventor: Michel Auffray, St. George de Chesné (FR)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/088,722

(22) Filed: Jun. 1, 1998

(30) Foreign Application Priority Data

Jun. 10, 1997 (FR) .............................. 97 07186

(51) Int. Cl.⁷ .......................... H04Q 7/20; H04B 1/40; H04M 11/00; G08C 17/00
(52) U.S. Cl. ................. 455/434; 455/77; 455/403; 455/426; 455/438; 455/452; 455/464; 370/311; 370/325; 370/337
(58) Field of Search ............... 455/434, 464, 455/452, 422, 403, 465, 553, 166.1, 4.1, 411, 574, 515, 426, 77, 511, 438; 370/325, 337, 311

(56) References Cited

U.S. PATENT DOCUMENTS

| | | | | |
|---|---|---|---|---|
| 3,898,390 A | * | 8/1975 | Wells et al. | |
| 4,352,955 A | * | 10/1982 | Kai et al. | |
| 4,656,653 A | | 4/1987 | Oda et al. | 379/61 |
| 4,768,219 A | * | 8/1988 | Yamagata | 455/464 |
| 4,768,220 A | * | 8/1988 | Yoshihara et al. | |
| 4,837,802 A | * | 6/1989 | Higashiyama et al. | |
| 5,044,010 A | * | 8/1991 | Frenkeil et al. | |
| 5,197,093 A | * | 3/1993 | Knuth et al. | 455/464 |
| 5,203,012 A | * | 4/1993 | Patsiokas et al. | |
| 5,280,630 A | * | 1/1994 | Wang | 455/452 |
| 5,418,839 A | * | 5/1995 | Knuth et al. | |
| 5,768,345 A | * | 6/1998 | Takebe et al. | |
| 5,774,805 A | * | 6/1998 | Zicker | 455/426 |
| 5,778,316 A | * | 7/1998 | Persson et al. | 455/434 |
| 5,809,419 A | * | 9/1998 | Schellinger et al. | 455/434 |
| 6,011,960 A | * | 1/2000 | Yamada et al. | 455/77 |
| 6,014,374 A | * | 1/2000 | Paneth et al. | 370/325 |
| 6,058,108 A | * | 5/2000 | Raith et al. | 370/337 |
| 6,064,889 A | * | 5/2000 | Fehnel | 455/511 |
| 6,069,880 A | | 5/2000 | Owen et al. | 370/311 |
| 6,070,082 A | * | 5/2000 | Zhao et al. | 455/464 |
| 6,075,981 A | * | 6/2000 | Shah et al. | 455/403 |
| 6,088,591 A | | 7/2000 | Trompower et al. | 455/438 |
| 6,167,260 A | | 12/2000 | Azam et al. | 455/426 |
| 6,167,262 A | | 12/2000 | Tanigawa | 455/426 |
| 6,212,396 B1 | | 4/2001 | Brown et al. | 455/464 |

FOREIGN PATENT DOCUMENTS

| | | |
|---|---|---|
| EP | 0055097 | 6/1982 |
| EP | 0768803 | 4/1997 |

* cited by examiner

*Primary Examiner*—William Cumming
(74) *Attorney, Agent, or Firm*—Dicran Halajian

(57) ABSTRACT

A cordless telephony device includes a base station for radio communication with a handset on an operating frequency selected from a set of frequencies. The base station and handset include a scanning element for receiving and analyzing a connection request transmitted on a transmit frequency between the base station and handset. The receiving one of the base station or handset detects the transmit frequency and selects the transmit frequency as the operating frequency for radio communication between the base station and handset.

2 Claims, 1 Drawing Sheet

CORDLESS TELEPHONY DEVICE HAVING A SCANNING ELEMENT TO ANALYZE A FRAME REQUESTING A CONNECTION

FIELD OF THE INVENTION

The present invention relates to a cordless telephony device comprising a module called base and at least a module called handset, in which each module includes a transmitting and a receiving circuit comprising, inter alia, means for settling on a channel of a plurality of channels which have different frequencies, an element called scanning element for receiving and analyzing the various channels in turns so as to examine whether a request for a connection is sent out on a channel by another module, and means for incorporating in the data of a data transmission on a given channel a data that defines the channel used.

BACKGROUND OF THE INVENTION

A radio telephone as defined in the opening paragraph above is known from the document EP-A-0 055 097. According to this document, a cellular telephone receives data indicating, for example, the channel number used by the transmitter.

In a cordless telephony device, a parasitic modulation is likely to occur during a scanning phase, if one entity, base or handset, transmits a carrier on a given channel, which modulation results in the fact that the receiver in the scanning mode may then receive this carrier although the receiver has settled on another channel. This receiver may thus be led to an error and be put in the receive mode on an unsuitable channel. To avoid this, there is habitually provided that the receiver reads the number indicated in the data, verifies the correspondence thereof with the channel on which it is settled and, if there is no correspondence, discards the reception and continues the scanning operation.

SUMMARY OF THE INVENTION

It is an object of the invention to render the response to a request for a connection between the base and the handset faster.

For this purpose, each module comprises means for reading from the data of the analyzed channel during a scanning operation the data that corresponds to the channel number and for immediately settling on the channel that carries this number if this channel number is different from that of the analyzed channel.

The invention is thus based on the idea of utilizing data, possibly received by error, for deriving useful information therefrom.

These and other aspects of the invention will be apparent from and elucidated with reference to the embodiments described hereinafter.

DETAILED DESCRIPTION OF THE INVENTION

Figures 1A, 1B:
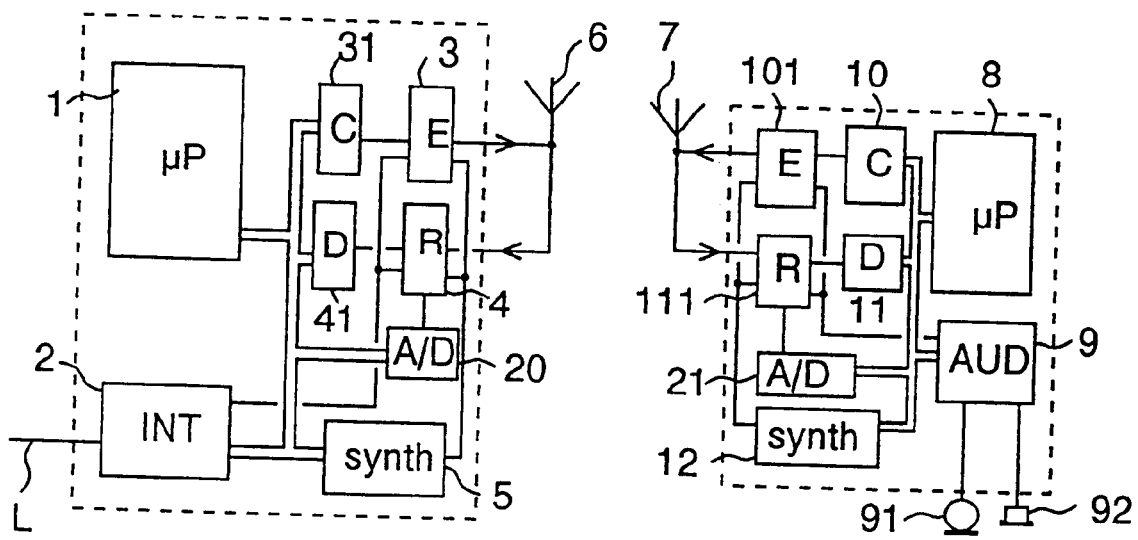
FIGS. 1A and 1B represents the diagram of a telephony device to which the invention is applied.

The telephony device comprises two elements: a base shown in FIG. 1A and a handset shown in FIG. 1B.

The base comprises an interface element 2 to a telephone line L, which interface element is known per se and is connected for communication with the handset to a radio transmitting element 3 and a radio receiving element 4, the two being connected to an antenna 6. A decoder 41 is connected to the radio receiving element 4 for decoding digital data. For coding digital data, a coder 31 is connected to the radio transmitting element 3. For allowing the choice of a channel frequency on request, the base has a known frequency synthesizer 5 with a phase measuring loop for controlling the frequency, called Phase-Locked Loop PLL. It further includes a microprocessor 1 for managing various functions, inter alia, the management of a scanning process. This microprocessor 1 is connected by a bus at least to the elements 2, 5, 31, 41 of the base for controlling them or receiving data from them.

The handset comprises a microphone 91 and an earphone 92 for the transmission of acoustic signals, both connected to an audio processing element 9 known per se. For the radio communication with the base, the handset comprises a radio transmission element 101 and a radio receiving element 111, the two being connected to an antenna 7. A decoder 11 is connected to the radio receiving element 111 for decoding digital data. A coder 10 is connected to the radio transmitting element 101 for coding digital data. For allowing the choice of a channel frequency on request, the handset also includes a known frequency synthesizer 12 which includes a phase-locked loop PLL. It further includes a microprocessor 8 for managing various functions, inter alia, the management of a scanning process. This microprocessor 8 is connected by a bus at least to the elements 9, 10, 11, 12 of the handset for controlling them or for receiving data therefrom.

When a module which may be the base as well as the mobile, wishes to establish a radio connection called link, it first searches for a free channel according to a technique known per se and which does not form part of the present invention. The party requesting the link thus sends on this channel a carrier which contains digital data formed by fixed-length frames. A frame contains, inter alia, an identification code of the module, a code for the request for setting up a link, a code indicating the channel number on which the transmitter is settled and on which transmitter wishes to set up the link. Such a request may be sent both by the handset and by the base.

Figure 2:
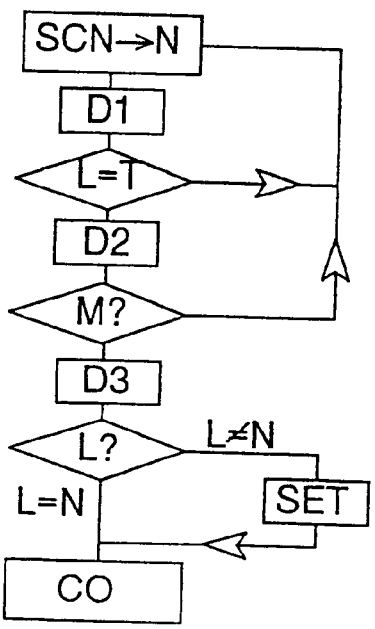
FIG. 2 is a flow chart of the scanning process.

The scanning element mentioned above is formed by software of the processor 1 or 8. The operation of this software is illustrated by FIG. 2 and comprises the following steps:

a routine SCN→N controls the positioning of the PLL circuit on a channel called N and then switches on the data detection and decoding, after a delay D1, the carrier level is measured and there is tested whether a carrier is present on the channel. At the start of the test denoted L=T, if the channel is free, the process turns back to the routine SCN→N to pass to the next channel N, whereas, if a carrier is detected on the channel, the processor further waits during a period of time of a delay D2, after this delay, during the test M?, there is examined whether data have been detected. If data have not been detected, the processor comes back to the routine SCN→N to pass to the next channel. If data have been detected, then the processor waits during a period of time of a new delay D3, then, during a test denoted L?, there is examined whether a request frame for a complete link has been received and detected, with a correct identification code of the mobile and a channel number in the data called number L then:

if the channel numbers L and N are identical, the communication CO between base and mobile is initiated.

if the channel number L is different from N, the processor goes to the routine SET which controls the positioning of the PLL circuit on the channel L, and then to the routine CO which establishes the communication.

What is claimed is:

1. A cordless telephony device comprising a base station for radio communication with a handset on channels, each one of said base station and said handset including:

a transmitter and a receiver for transmitting and receiving signals between said base station and said handset on said channels;

a channel positioning means capable of settling a receiver at one of said base station or handset to a current channel number (N) for enabling receipt of signals on said channel; and, a scanning element for scanning said channels to receive and analyze a frame requesting a connection transmitted on a current channel of said channels by a requesting one of said base station and said handset, said request frame including a channel number (L) of a communication channel selected from said channels; and, wherein said scanning element of a receiving one of said base station and said handset detects said channel number (L) included in said request frame; and, in response to said detecting, initiates said channel positioning means to immediately settle one of a receiving one of said base station and said handset on said channel number (L) for completing said connection when said current channel number (N) is not equal to said channel number (L), or otherwise immediately establishing communication when said current channel (N) is equal to (L).

2. The cordless telephony device of claim 1, wherein said receiving one of said base station and said handset selects said communication channel after detecting a carrier and data on said current channel while scanning said channels.

* * * * *